United States Patent
Babol et al.

(10) Patent No.: US 10,476,983 B2
(45) Date of Patent: Nov. 12, 2019

(54) SYSTEMS MONITORING IN CASE OF LOST NETWORK CONNECTION IN SAAS MODEL

(71) Applicant: INTERNATIONAL BUSINESS MACHINES CORPORATION, Armonk, NY (US)

(72) Inventors: Adam Babol, Cracow (PL); Stefan Gruszczynski, Cracow (PL); Pawel T. Januszek, Cracow (PL); Jacek Midura, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 662 days.

(21) Appl. No.: 14/855,589

(22) Filed: Sep. 16, 2015

(65) Prior Publication Data

US 2017/0078435 A1    Mar. 16, 2017

(51) Int. Cl.
*G06F 15/167* (2006.01)
*H04L 29/08* (2006.01)
*H04L 12/24* (2006.01)
*H04L 12/26* (2006.01)

(52) U.S. Cl.
CPC ...... *H04L 67/2842* (2013.01); *H04L 41/0645* (2013.01); *H04L 41/0654* (2013.01); *H04L 43/0811* (2013.01)

(58) Field of Classification Search
CPC ............. H04L 67/2842; H04L 41/0645; H04L 41/0654
USPC ........................................................ 709/212
See application file for complete search history.

(56) References Cited

U.S. PATENT DOCUMENTS

| | | | |
|---|---|---|---|
| 8,493,210 B2 | 7/2013 | Maziak et al. | |
| 2006/0095401 A1* | 5/2006 | Krikorian | H04L 29/06027 |
| 2007/0203972 A1* | 8/2007 | Wewalaarachchi | G06F 17/30864 709/202 |
| 2011/0221592 A1* | 9/2011 | Maziak | G06F 11/0748 340/540 |
| 2011/0282168 A1* | 11/2011 | Weiss | A61B 5/742 600/323 |
| 2012/0246297 A1* | 9/2012 | Shanker | H04L 67/2842 709/224 |
| 2014/0280920 A1 | 9/2014 | Foley et al. | |

* cited by examiner

*Primary Examiner* — Umar Cheema
*Assistant Examiner* — Hannah S Wang
(74) *Attorney, Agent, or Firm* — Alexander Jochym; Matthew M. Hulihan; Heslin Rothenberg Farley & Mesiti PC

(57) ABSTRACT

A method is provided for monitoring computing devices by a monitoring server, where the computing devices send status messages to the monitoring server via a network communication link. The method includes receiving a first alert message at a monitoring console if a condition is detected by the monitoring server that is defined in an alert definition, and communicating the alert definition to an alert cache system. Based on the network failing, sending the status messages from the computing devices to the alert cache system, storing the status messages in the alert cache system until the network is back online, sending a second alert message from the alert cache system to the monitoring console, and sending the stored status messages to the monitoring server after the network communication link is back online.

19 Claims, 6 Drawing Sheets

SYSTEMS MONITORING IN CASE OF LOST NETWORK CONNECTION IN SAAS MODEL

BACKGROUND

Today, enterprises are looking to operate their information technology (IT) infrastructure in a safe and managed way while trying to reduce operating costs at the same time. One solution is to change from an on-premise software deployment to a software-as-a-service (SaaS) model, wherein parts of the information technology resources are outsourced to an external company. In that case, the complete IT infrastructure for a specific service is deployed by a service provider and only the service is consumed on demand by the enterprise. Typically, in the past, systems management tools and monitoring solutions have been deployed on-premise—i.e., in-house—as part of the IT operations tasks. However, monitoring solutions are now also provided as SaaS offerings. In this case, enterprise customers keep monitoring agents on their own systems, whereas a monitoring server is maintained and operated by an external company. Typically, such offerings rely on the fact that the Internet is always up and running. However, this may not always be the case. In times of an outage of the Internet, SaaS services may not be consumed any longer and monitoring solutions may no longer be able to monitor for proper operation of an IT infrastructure of an enterprise.

One solution to this dilemma may be to deploy an identical backup monitoring server on-premise of the enterprise which IT infrastructure needs to be monitored. However, in this case the cost advantages of deploying a monitoring system as a SaaS service are fading away.

SUMMARY

According to one or more aspects, a method of monitoring computing devices by a monitoring server is presented herein. The method includes: receiving a first alert message at a monitoring console if a condition is detected by the monitoring server, wherein the condition is defined in an alert definition, and wherein the monitored computing devices are adapted for sending status messages to the monitoring server via a network communication link, and the monitored computing devices reside in a first geographical location and the monitoring server resides at a second geographical location; communicating the alert definition to an alert cache system which is part of the computing devices; based on the network communication link between the computing devices and the monitoring server failing, performing the following: sending the status messages from the computing devices, instead of to the monitoring sever via the network communication link, to the alert cache system; storing the status messages in the alert cache system until the network communication link is back online; sending a second alert message from the alert cache system to the monitoring console if a condition is detected by the alert cache system that is based on the communicated alert definition from the monitoring server to the alert cache system; and sending the stored status messages to the monitoring server after the network communication link is back online.

Systems and computer program products implementing the above-summarized method, and enhancements thereof, are also described and claimed herein.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the following description that, unless otherwise notified, in addition to any combination of features belonging to one type of subject-matter, also any combination between features relating to different subject-matters, in particular, between features of the method type claims, and features of the apparatus type claims, are considered as to be disclosed within this document.

The aspects defined above and further aspects of the present invention are apparent from the examples of embodiments described hereinafter and are explained with reference to the examples of embodiments, but to which the invention is not limited.

Figure 1:
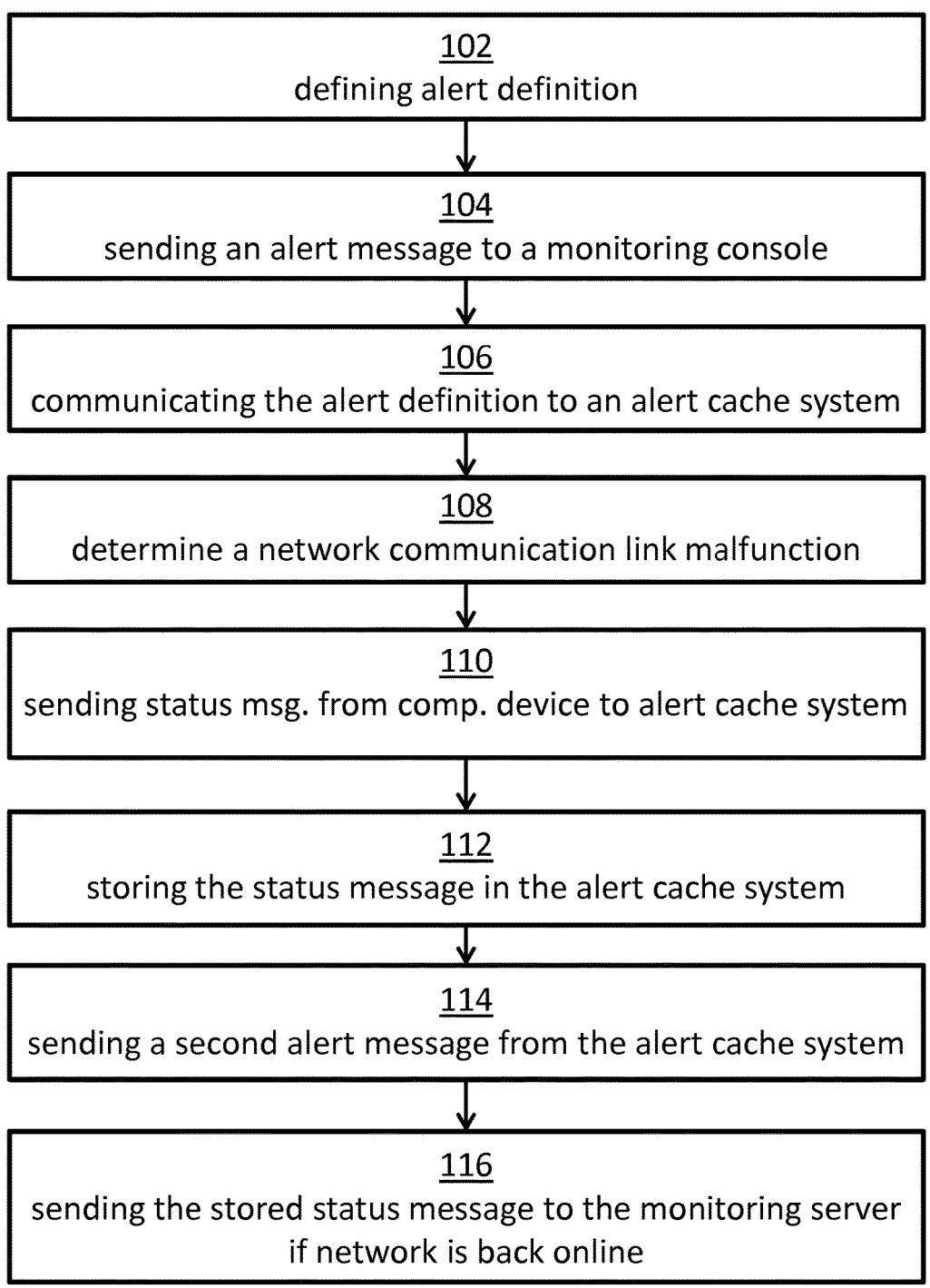
Figure 2:
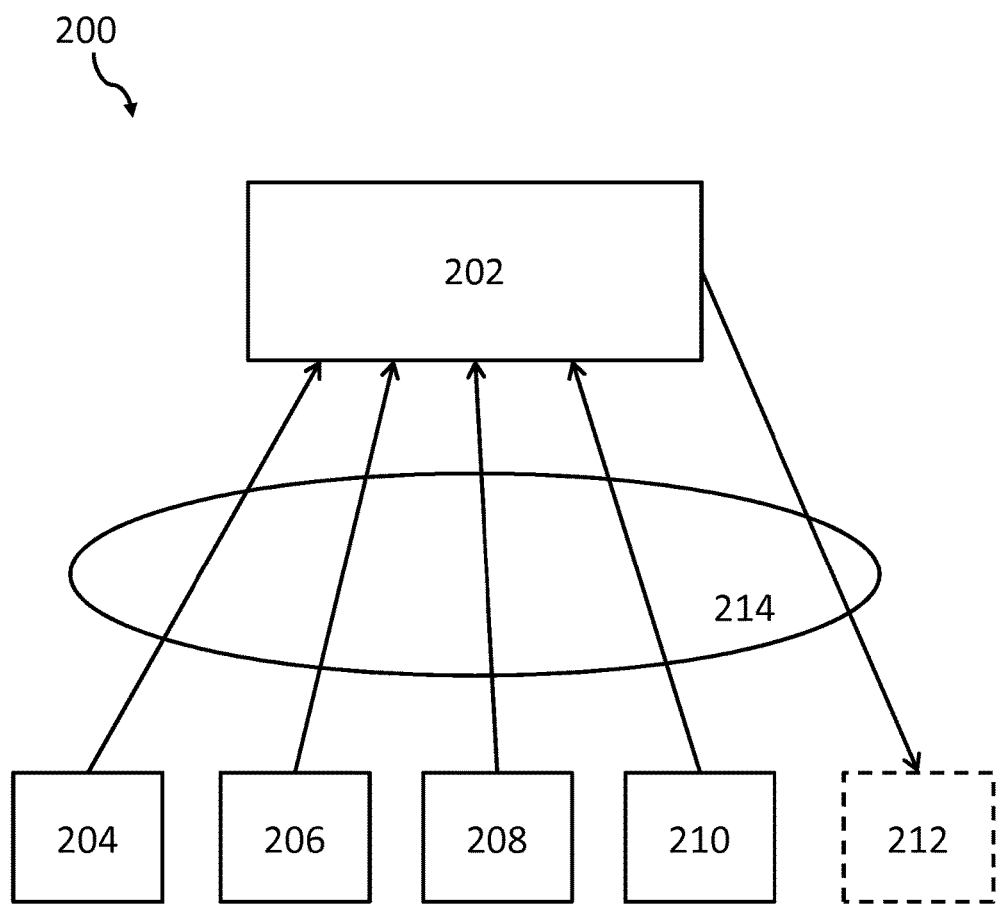
Figure 3:
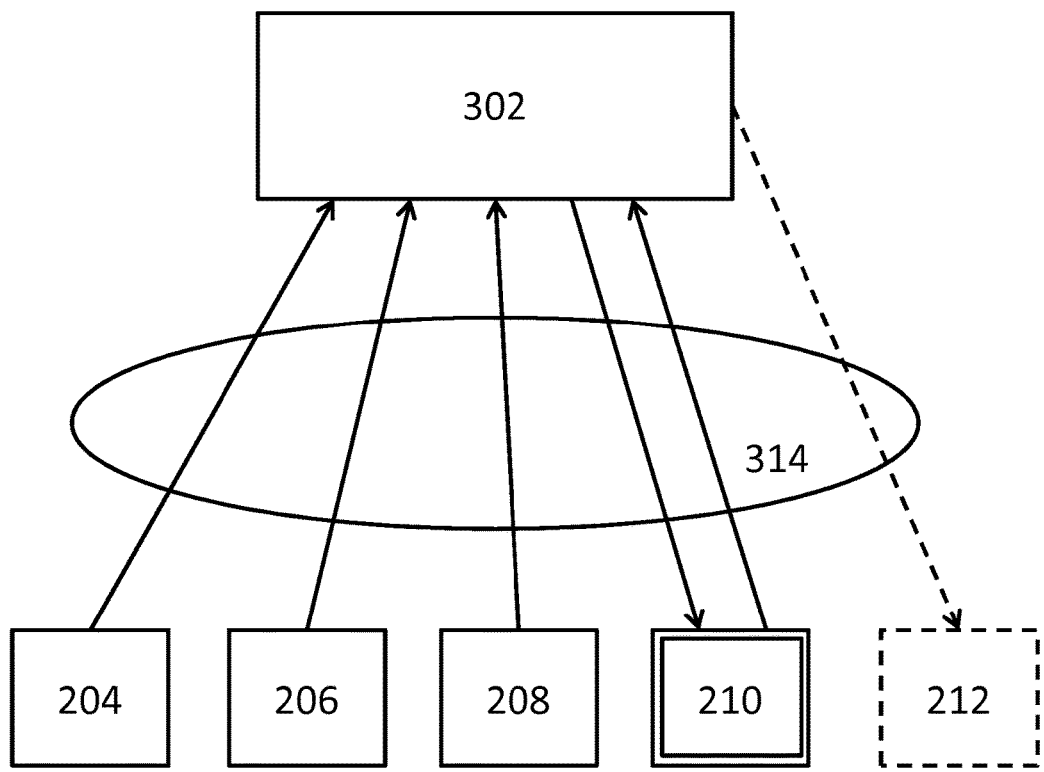
Figure 4:
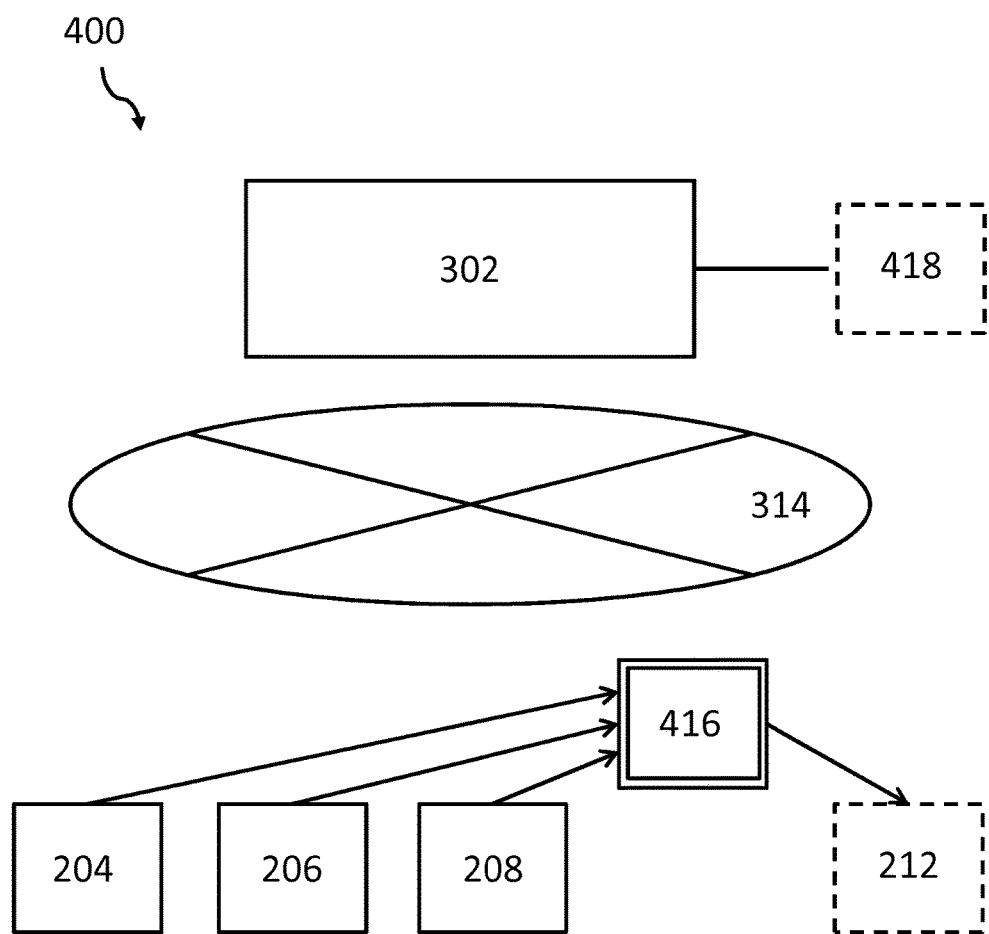
Figure 5:
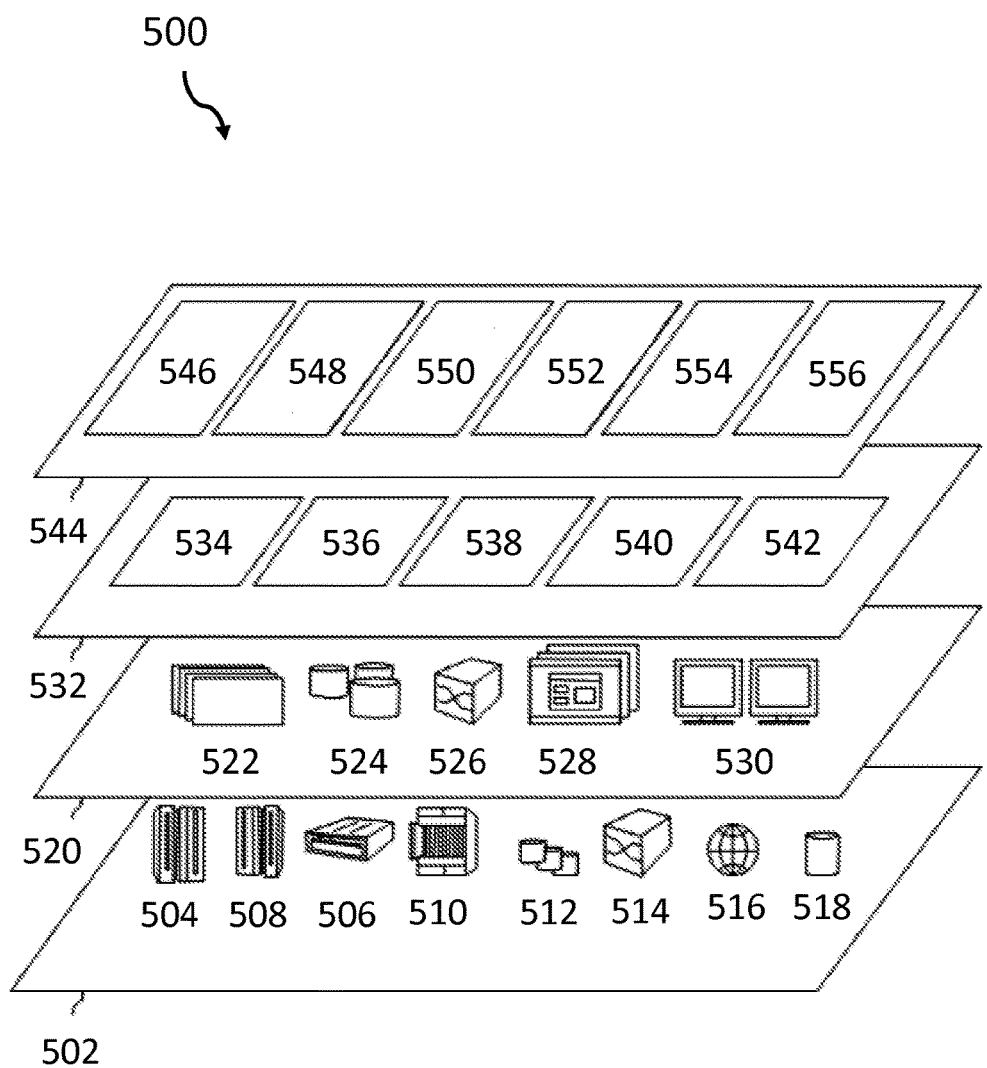
Figure 6:
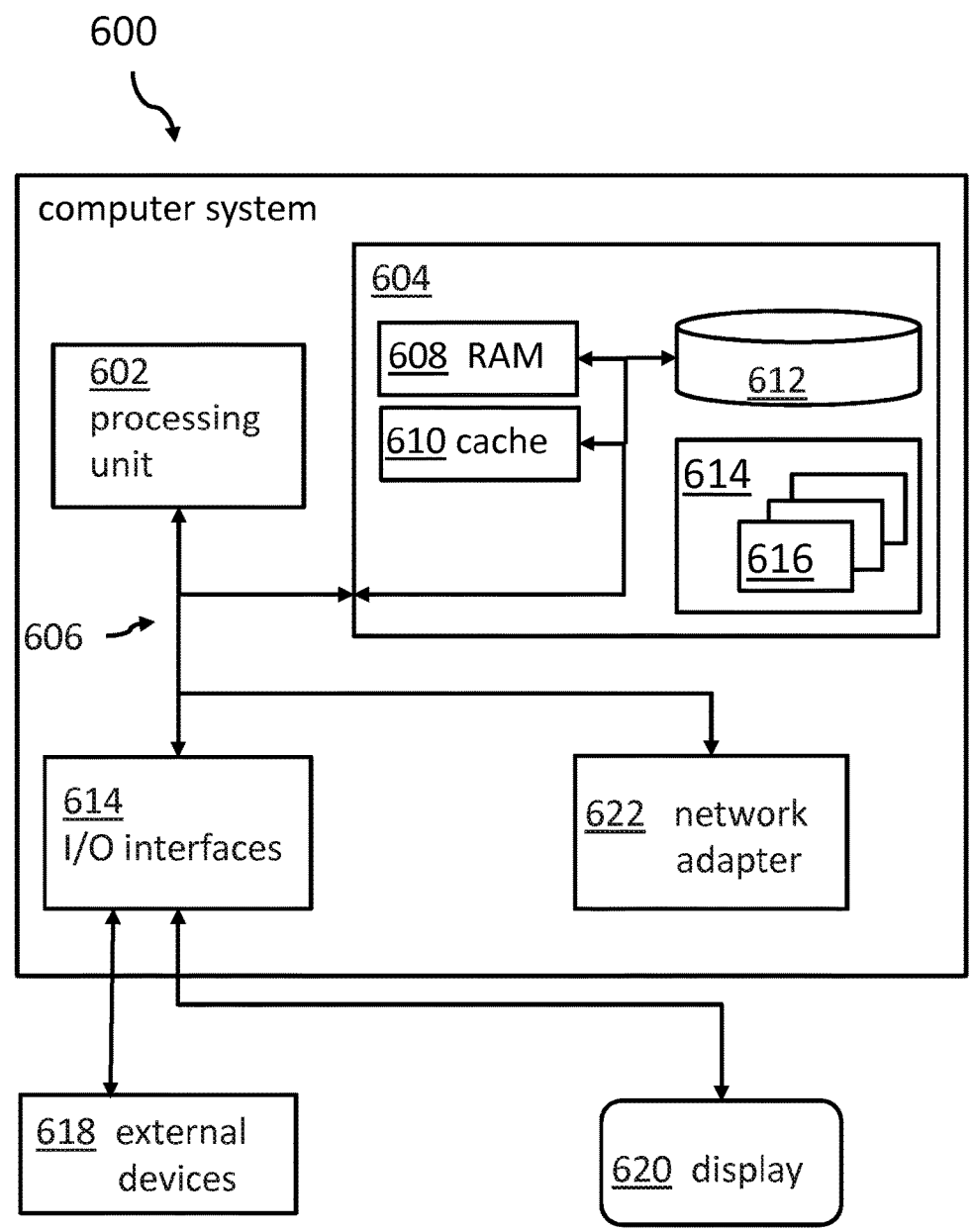

Embodiments of the invention are described below, by way of example only, with reference to the following drawings, in which:

FIG. 1 shows a block diagram of one embodiment a method for monitoring computing devices, in accordance with one or more aspects of the present invention;

FIG. 2 shows a block diagram of a monitoring environment, in accordance with one or more aspects of the present invention;

FIG. 3 shows a block diagram of an environment with an alert cache system, in accordance with one or more aspects of the present invention;

FIG. 4 shows an embodiment of an environment with an alert cache system in action, in accordance with one or more aspects of the present invention;

FIG. 5 shows a cloud computing environment in which parts of the inventive concepts disclosed herein may be deployed, in accordance with one or more aspects of the present invention;

FIG. 6 shows an embodiment of a computing system which may be used, for instance, for the monitoring server, the alert cache system and/or the computing devices, in accordance with one or more aspects of the present invention.

DETAILED DESCRIPTION

In the context of this description, the following conventions, terms and/or expressions may be used:

The term 'monitoring server' may denote a computer system or server or cluster of computer servers deployed for monitoring other computing devices. For that purpose the monitoring server may receive status messages from the monitored devices, in particular from monitoring agents installed on one or more monitored computing devices or systems. The status messages may comprise data about the hardware status or the software status, as well as special events happening to the monitored computing devices, like environmental conditions and user or maintenance actions.

The term 'status message' (or messages) may denote data about a status of a computing device. This data may relate to any hardware or software component of the monitored computing device, as well as to environmental data. The data may be sent periodically based on a predefined schedule or when occurring, or in a mixture of both options. The sending the status messages may be based on alert conditions and/or alert definitions.

The term 'first geographical location may denote in contrast to a second geographical location that one system in a first geographical location may be installed remotely to another one in a second geographical location. This may typically be the case in cloud computing environment. A cloud computing center may be installed remotely to the service consuming devices, i.e., the monitored devices.

The term 'first alert message' may denote a message highlighting a special condition of a monitored data set. An alert condition may have been defined before. It may, e.g., be a threshold value for a temperature, a CPU, a memory system, a network usage, or a fill rate of a hard drive. Basically, the first alert message may be generated and sent according to a predefined condition. The first alert message may be sent to a monitoring console.

The term 'monitoring console' may denote a user device—a computing system of an operator, a mobile device, smart phone, etc.—needing to be informed if the computing environment gets into a predefined status that may need special attention to guarantee continuous operation. Also, warnings may be sent to the monitoring console. It may be noted that there may be different sets of monitoring consoles. There may be a monitoring console directly attached to the monitoring server—or via a local area network on the same premise, i.e., at the same geographical position or surrounding. Additionally, there may be a monitoring console as part of the computing environment of the computing devices to be monitored. These computing devices to be monitored may belong to one legal entity (one company) which may have defined its own monitoring console. Hence, if a cloud monitoring system may serve several companies there may be one monitoring console dedicated to the monitoring server and a plurality of monitoring consoles at the different companies using the services of the cloud monitoring server.

The term 'alert definition' may denote a rule defining when an alert may have to be generated. Such alert definitions may be used as part of a monitoring agent and stored on one of the computing systems or it may be part of the functionality of the monitoring server. Alert definitions may be dynamically definable depending on specific workload conditions of the monitored computing systems.

The term 'alert cache system' may denote a computing system being connected to the same physical network of the monitoring computing systems. Typically, this may be a local area network used at the first geographical position and surroundings, i.e., on the premise of a company having all of the parts of the computing systems being monitored by a monitoring server being operated in a SaaS model.

The term 'cloud computing' may in this context be interpreted as a model for enabling convenient, on-demand network access to a shared pool of configurable computing resources (e.g., networks, servers, storage, applications, and services) that can be rapidly provisioned and released with minimal management effort or service provider interaction. This Cloud model promotes availability and may comprise five characteristics, three service models and four deployment models.

The characteristics of cloud computing may comprise:
(i) On-demand self-service. A consumer can unilaterally provision computing capabilities, such as server time and network storage, as needed automatically without requiring human interaction with each service provider.
(ii) Broad network access. Capabilities are available over the network and accessed through standard mechanisms that promote use by heterogeneous thin or thick client platforms (e.g., mobile phones, laptops, and PDAs).
(iii) Resource pooling. The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.
(iv) Rapid elasticity. Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.
(v) Measured Service. Cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both, the provider and consumer of the utilized service.

Service models for Cloud Computing used may comprise:
(i) Cloud Software as a Service (SaaS). The capability provided to the consumer is to use the provider's applications running on a Cloud infrastructure. The applications are accessible from various client devices through a thin client interface such as a web browser (e.g., web-based e-mail). The consumer does not manage or control the underlying Cloud infrastructure including network, servers, operating systems, storage, or even individual application capabilities, with the possible exception of limited user-specific application configuration settings.
(ii) Cloud Platform as a Service (PaaS). The capability provided to the consumer is to deploy onto the Cloud infrastructure consumer-created or acquired applications created using programming languages and tools supported by the provider. The consumer does not manage or control the underlying Cloud infrastructure including network, servers, operating systems, or storage, but has control over the deployed applications and possibly applications hosting environment configurations.
(iii) Cloud Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying Cloud infrastructure, but has control over operating systems, storage, deployed applications, and possibly limited control of selected networking components (e.g., host firewalls).

Deployment models for Cloud computing may comprise:
(i) Private Cloud. The Cloud infrastructure is operated by an organization. It may be managed by the organization or a third party and may exist on premise or off premise.
(ii) Community Cloud. The Cloud infrastructure is shared by several organizations and supports a specific community that has shared concerns (e.g., mission, security requirements, policy, and compliance considerations). It may be managed by the organizations or a third party and may exist on premise or off premise.
(iii) Public Cloud. The Cloud infrastructure is made available to the general public or a large industry group and is owned by an organization selling Cloud services.
(iv) Hybrid Cloud. The Cloud infrastructure is a composition of two or more Clouds (private, community, or public) that remain unique entities but are bound together by standardized or proprietary technology that enables data and application portability (e.g., Cloud bursting for load-balancing between Clouds).

It may be noted that Cloud software takes full advantage of the Cloud paradigm by being service-oriented with a focus on statelessness, low coupling, modularity, and semantic interoperability.

Generally stated, according to one aspect of the present invention, a method for monitoring computing devices is provided. The monitoring may be performed by a monitoring server. The monitored computing devices may send status messages to the monitoring server via a network communication link. The monitored devices may reside in a first geographical location and the monitoring server may reside in a second geographical location. The method may comprise sending a first alert message to a monitoring console if a condition may be detected by the monitoring server that may be defined in an alert definition and communicating the alert definition to an alert cache system which is part of the computing devices. If the network communication link between the computing devices and the monitoring server may fail, the following may be performed: sending the status messages from the computing devices, instead of to the monitoring server via the network communication link, to the alert cache system; and storing the status message(s) in the alert cache system until the network communication link may be back online.

Furthermore, the method may comprise sending a second alert message from the alert cache system to the monitoring console if a condition is detected by the alert cache system that may be based on the communicated alert definition from the monitoring server to the alert cache system, and sending the stored status messages to the monitoring server if the network communication link is back online.

According to another aspect of the present invention, a system for monitoring computing devices is provided. The system for monitoring computing devices may comprise a monitoring server. The monitored computing devices may be adapted for sending status messages to the monitoring server via a network communication link. The monitored devices may reside in a first geographical location and the monitoring server may reside in a second geographical location. The system for monitoring computing devices may also comprise a first receiving unit at a monitoring console adapted to receive sent first alert message by the monitoring console if a condition is detected by the monitoring server that is defined in an alert definition, and a second receiving unit as part of an alert cache system adapted for receiving the alert definition.

The computing devices may be adapted, in case the network communication link between the computing devices and the monitoring server fails, for performing the following: sending the status messages from the computing devices instead to the monitoring server via the network communication link to the alert cache system and storing the status messages in the alert cache system until the network communication link may be back online, and sending a second alert message from the alert cache system to the monitoring console if a condition may be detected by the alert cache system that is based on the communicated alert definition from the monitoring server to the alert cache system. The alert cache system may also be adapted for sending the stored status messages to the monitoring server if the network communication link is back online.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The proposed method for monitoring computing devices may offer numerous advantages, including:

By deploying an alert cache system as part of the monitored computing devices—i.e., as part of an enterprise's IT infrastructure—a basic set of monitoring functionality may still be available even if an Internet outage occurs. In case of a failure of the Internet connection between the monitoring server and the IT infrastructure or computing devices to be monitored, the alert cache system may collect alert messages instead of the remote monitoring server collecting them. An operator may be informed instantaneously about the Internet link problems. However, the alert cache system is not representing a one-two-one backup system to the monitoring server. Only a very limited set of lightweight functions may be made available as part of the alert cache system. An operator may have insight into alert messages generated during the Internet outage. However, no sophisticated automatic management functions to the IT infrastructure, i.e., to the monitored computing devices, may be available. Thus, the alert cache system may be seen as a lightweight interims system allowing a continuous collection of alert messages while an external network link, i.e., the Internet, is down.

It may be noted that a sophisticated function of the proposed alert cache system is that alert definitions, which have been defined on the monitoring server, are made available to the alert cache system as long as the network connection is up and running Thus, the alert cache system may have access to the alert definitions even if the network connection is down. Thus, the alert cache system is enabled to collect alert messages in the same way the monitoring server would do but without having a one-to-one backup functionality if compared to the monitoring server. Additionally, the alert cache system may be used for normal operation tasks of the computing devices during a functioning network communication link, i.e., the Internet; this is because in this case no alert cache function need to be executed.

Hence, the collected alert messages in the alert cache system may be uploaded to the monitoring server once the network communication link is back online again. Because the alert cache system has had the alert definitions available during its interim alert message collection task, the alert messages may be uploaded to the monitoring server exactly in the way the monitoring server would expect it without a broken network link. Thus, nearly no overhead may be involved in operating the alert cache system as interims alert message collection system based on the alert definitions of the monitoring server.

FIG. 1 shows a block diagram of the embodiment of a method 100 for monitoring computing devices, in accordance with one or more aspects of the present invention. The devices may, in particular, comprise computers of any form, network devices, storage devices, etc.; basically, a complete IT center equipment may represent computing devices to be monitored. The monitoring may be performed by a monitoring server, wherein the monitored computing devices may send status messages to the monitoring server via a network communication link, such as the Internet, and wherein the monitored devices reside in a first geographical location and the monitoring server resides in a second geographical location. This means that the monitored computing devices and the monitoring server may be installed remotely to each other. The monitoring server may be installed at the premise of a company offering monitoring services, such as a cloud service provider. These monitoring services may be consumed by another company in a different place.

The method may comprise defining, 102, at least one alert definition and sending, 104, a first alert message, in particular more than one, to a monitoring console if a condition—in particular at least one—may be detected by the monitoring server that is defined in an alert definition. This monitoring console may also be one of the monitored computing devices. The method may further comprise communicating, 106, the alert definition to an alert cache system which is part of the computing devices.

It may also be determined, 108, that the network communication link between the computing devices and the monitoring server fails because the network communication link shows a malfunction, e.g., a wide area network outage and/or an Internet outage.

If that should happen, then the following may be performed: sending, 110 the status messages from the computing devices, instead of to the monitoring server via the network communication link, to the alert cache system, e.g., using a local area network; storing, 112, the status messages in the alert cache system until the network communication link is back online; sending, 114, a second alert message from the alert cache system to the monitoring console if a condition is detected by the alert cache system that is defined in the communicated alert definition from the monitoring server to the alert cache system; and sending, 116, the stored status messages to the monitoring server if the network communication link is back online.

According to an additional embodiment of the present invention, the monitoring console may be located in the first geographical location, in particular on the premise of the monitored computing devices. It may be an operator console using the services of the monitoring server. Thus, the owner of the monitored devices may always be informed about his monitored computing devices.

According to another embodiment of the present invention, the network communication link may be based on the Internet. This may nowadays be a typical setup in cloud computing environments. Service consumers and service providers are linked via the public Internet.

According to an optional embodiment, the alert definition may comprise alert descriptors. This may allow for a practical way to define alert conditions. Operators may not need to change their existing workflows.

According to another embodiment of the present invention, the alert cache system may be inactive if the network communication link is active. The related computing system may perform other tasks. In case of a failure of the network communication link, the alert cache system may become active as a system caching status and alert messages from the monitored computing devices. Afterwards, the alert cache system may become inactive again after the collected alert messages have been transmitted to the monitoring server. The system used as the alert cache system may then become a normal computing device again.

According to one optional embodiment of the present invention, the alert cache system may receive the first alert messages periodically from the monitoring server. This may have the advantage that an operator may view the first alert message in the alert cache system and may find an interpretation for the network outage. Thus, a reconnection to the Internet may be achieved faster, which may allow a normal operation mode to be entered in which the monitoring server performs the monitoring of the monitored computing devices. It may also be mentioned that the computing devices may comprise at least one of a computer system, a network device, a computing server, a storage system, an embedded system, devices relating to the Internet of things, like sensors, facility management element, mobile devices, production machines, logistics and/or warehouse facilities, etc.

According to another embodiment of the present invention, the monitoring server may send the first alert message via an alternative communication link to the monitoring console, for instance, should the primary network communication link, such as the Internet, be down. This way, an operator may receive information about the network outage via a message to a mobile device, like a smartphone. The operator may then pay special attention to the operation of the alert cache system, which may have taken over colleting the status messages from the monitored computing devices.

It should be understood that a down network communication link may also comprise an outage of an adapter or bridge system connecting the monitoring server to, for instance, the Internet. The broken network communication line may simply say that no connection from the monitoring server to the monitored computing devices is possible.

According to another embodiment of the present invention, the second alert message may be sent by the alert cache system via an alternative communication link to a mobile monitoring console, e.g., a smart phone or other alerting system which may receive alert messages. This way, an operator on the premise of the monitored devices may be informed about the network problems, e.g., by a wireless message—in particular by a Wi-Fi based message or a local paging server, or any other wireless communication channel intact and operational on the premise where the monitored computing devices are located—that the network to the monitoring server may be down. This may particularly be useful if the monitoring server has problems connecting to any external network connection. However, because the alert cache system is aware of the problematic situation caused by the network outage, the local operator may be informed in any case. Normally, the operator may not pay attention to the local monitoring console because in the normal case the monitoring system and an operator responsible for the services of the monitoring server may take care of the monitoring activities. However, if the network communication link is down, a local operator may need to be informed immediately.

FIG. 2 shows an on-premise monitoring model 200. A monitoring server 202 and monitoring agents running on the monitored computing devices 204, 206, 208, 210 are in the same network 214. A monitoring console 212 may inform an operator about the status of the monitored computing system. The monitoring console 212 may not only function as an information system for an operator, but may also be part of the monitored computing systems.

The monitoring agents may send management data of system health of the monitored computing devices 204, 206, 208, 210 and the monitoring server 202 may raise alerts to the monitoring console 212 if conditions are met based on data received from the monitoring agents. Usually, there may be a backup server (not shown) which may handle monitoring agents' data and send alert messages when the primary monitoring server 202 may be down. In a SaaS model, also the backup server which may be as remote as the primary monitoring server 202 also requires network communication links, i.e., the Internet. However, a core concept of a SaaS model is that no backup systems have to be installed on premise, i.e., at the geographical position of the monitored computing devices 204, . . . , 210.

FIG. 3 shows a monitoring server 302 positioned at a different geographical location than the monitored computing devices 204, . . . , 210. In this case, the monitoring software (not shown) being executed on the monitoring server 302 may be deployed in a SaaS model. Thus, a service provider may operate the monitoring server 302. The monitored computing devices 204, . . . , 210 continue to run the monitoring agents. However, the monitoring server 302 and the monitored computing devices 204, . . . , 210—and eventually also monitoring console 212—are not connected within the same network 214 but using a public network or network communication link 314, such as the Internet. In this case, problems may arise if the interconnection 314 may be broken. Then, the monitoring agents installed on the monitored computing devices 204, . . . , 210 may not be able to send their alert messages and operating measurement data to the monitoring server 302.

A solution to this problem is shown in FIG. 4, which illustrates the monitoring environment 400 with a broken Internet connection. In this case, an alert cache system 416 may collect and cache data and messages from the monitored computing devices 204, 206, 208. The alert cache system 416 may also send alert messages to a monitoring console 212 instead of the monitoring server 302. An operator may also be enabled—via management console 212—to look through cached data and messages received from the monitoring agents of the monitored computing devices 204, 206, 208. However, typically, the alert cache system 416 may not have any historical data and alert messages of the monitoring server 302.

Note that the monitoring server may also have a server monitoring console 418 attached. This may be the standard monitoring console of the service provider of the SaaS monitoring services. The server monitoring console 418 may be located at the premise of the monitoring service provider.

On the other side, the alert cache system 416 may have received and stored alert definitions of the monitoring server 302 during times when the Internet connection 314 has been up and running Thus, the alert cache system 416 may be operated as an interim data collection system for the monitoring server and at the same time may not collect any alert messages and operating data of the monitored computing devices 204, 206, 208 but only those that may require special treatment based on the alert definitions received from the monitoring server 302.

Once the Internet connection 314 comes back online, the alert cache system 416 may upload the collected data from the monitoring agents running on the monitored computing devices 204, 206, 208 to the monitoring server 302, which may continue its operation as if no Internet outage had occurred. AS this point, the alert cache system 416 does not receive operating data and alert messages from the monitoring agents running on the monitored computing devices 204, 206, 208, any longer. Instead, the monitoring agents send their data and alert messages again to the monitoring server 302 directly.

It may be noted that the inventive concepts disclosed herein may be performed in a cloud computing environment. A cloud computing environment may comprise one or more cloud computing nodes with which local computing devices used by cloud consumers, such as, for example, personal digital assistant (PDA) or cellular telephone, desktop computer, laptop computer, and/or e.g., automobile computer system may communicate. The nodes may communicate with one another. They may be grouped (not shown) physically or virtually, in one or more networks, such as private, community, public, or hybrid clouds as described hereinabove, or a combination thereof. This allows cloud computing environment to offer infrastructure, platforms and/or software as services for which a cloud consumer does not need to maintain resources on a local computing device. It is understood that the types of computing devices are intended to be illustrative only and the computing nodes and cloud computing environment can communicate with any type of computerized device over any type of network and/or network addressable connection (e.g., using a web browser).

FIG. 5 shows a cloud computing environment 500 in which at least parts of the inventive concept may be deployed. A set of functional abstraction layers provided by cloud computing environment is shown. It should be understood in advance that the components, layers, and functions shown in FIG. 5 are intended to be illustrative only and embodiments of the invention are not limited thereto. As depicted, the following layers and corresponding functions are provided: Hardware and software layer 502 includes hardware and software components. Examples of hardware components include: mainframes 504; servers 506; RISC (Reduced Instruction Set Computer) architecture based servers 508; Blade servers 510; storage devices 512; networks 514 and networking components 514. In some embodiments, software components include network application server software 516 and/or database software 518.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530. In one example, management layer 532 may provide the functions described below. Resource provisioning 534 provides dynamic procurement of computing resources and other resources that are utilized to perform tasks within the cloud computing environment. Metering and Pricing 536 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 538 provides access to the cloud computing environment for consumers and system administrators. Service level management 540 provides cloud computing resource allocation and management such that required service levels are met. Service Level Agreement (SLA) planning and fulfillment 542 provides pre-arrangement for, and procurement of, cloud computing resources for which a future requirement is anticipated in accordance with an SLA.

Workloads layer 544 provides examples of functionality for which the cloud computing environment may be utilized. Examples of workloads and functions which may be provided from this layer include: mapping and navigation 546; software development and lifecycle management 548; virtual classroom education delivery 550; data analytics processing 552; transaction processing 554; and the monitoring function 556 of the monitoring server 302.

Embodiments of the invention may be implemented together with virtually any type of computer, regardless of the platform being suitable for storing and/or executing program code. FIG. 6 shows, as an example, a computing system 600 suitable for executing program code related to the proposed method. Special functions may be performed by dedicated hardware implementations.

The computing system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couples various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

Program/utility 614, having a set (at least one) of program modules 616, may be stored in memory 604 by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the invention as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for monitoring computing devices by a monitoring server, the method comprising:
   receiving a first alert message at a monitoring console if a condition is detected by the monitoring server, wherein the condition is defined in an alert definition, and wherein status messages being sent from the monitored computing devices are initially directed to the monitoring server via a network communication link between the computing devices and the monitoring server when the communication link is online, wherein an alert cache system which is part of the computing devices does not receive the status messages directed to the monitoring server when the network communication link is online, and wherein the monitored computing devices reside at a first geographical location and the monitoring server resides at a second geographical location, the first geographical location being different from the second geographical location;
   communicating the alert definition to the alert cache system;
   based on the network communication link between the computing devices and the monitoring server failing, performing the following:
      redirecting the sending of status messages from the computing devices, the redirecting providing that status messages being sent from the monitored computing devices are directed to the alert cache system instead of to the monitoring server via the network communication link, wherein based on the network communication link failing, the alert cache system commences receipt of the status messages;
      storing, in the alert cache system, status messages sent from the monitored computing devices to the alert cache system until the network communication link is back online; and
      sending a second alert message from the alert cache system to the monitoring console if a condition is detected by the alert cache system that is based on the communicated alert definition from the monitoring server to the alert cache system; and
   based on the network communication link between the computing devices and the monitoring server going back online, sending the stored status messages to the monitoring server and reverting the sending of status messages from the monitored computing devices to provide that status messages being sent from the monitored computing devices are again directed to the monitoring server via the network communication link, wherein the alert cache system again does not receive the status messages directed to the monitoring server when the network communication link is online.

2. The method of claim 1, wherein the monitoring console is located in the first geographical location.

3. The method of claim 1, wherein the network communication link is based on the Internet.

4. The method of claim 1, wherein the alert definition comprises alert descriptors.

5. The method of claim 1, wherein the alert cache system is inactive when the network communication link is active.

6. The method of claim 1, wherein the first alert message is additionally sent to the alert cache system by the monitoring server.

7. The method of claim 1, wherein the computing devices comprise at least one of a computer system, a network device, a computing server, a storage system, or an embedded system.

8. The method of claim 1, wherein the monitoring server sends the first alert message via an alternative communication link to the monitoring console.

9. The method of claim 1, wherein the second alert message is sent by the alert cache system via an alternative communication link to a mobile monitoring console.

10. A computer system for monitoring computing devices by a monitoring server, the computer system comprising:
   a memory; and
   a processor in communication with the memory, wherein the computer system is configured to perform a method comprising:
      receiving a first alert message at a monitoring console if a condition is detected by the monitoring server, wherein the condition is defined in an alert definition, and wherein status messages being sent from the monitored computing devices are initially directed to the monitoring server via a network communication link between the computing devices and the monitoring server when the communication link is online, wherein an alert cache system which is part of the computing devices does not receive the status messages directed to the monitoring server when the network communication link is online, and wherein the monitored computing devices reside at a first geographical location and the monitoring server resides at a second geographical location, the first geographical location being different from the second geographical location;
      communicating the alert definition to the alert cache system;
      based on the network communication link between the computing devices and the monitoring server failing, performing the following:
         redirecting the sending of status messages from the computing devices, the redirecting providing that status messages being sent from the monitored computing devices are directed to the alert cache system instead of to the monitoring server via the network communication link, wherein based on the network communication link failing, the alert cache system commences receipt of the status messages;
         storing, in the alert cache system, status messages sent from the monitored computing devices to the alert cache system until the network communication link is back online; and
         sending a second alert message from the alert cache system to the monitoring console if a condition is detected by the alert cache system that is based on the communicated alert definition from the monitoring server to the alert cache system; and based on the network communication link between the computing devices and the monitoring server going back online, sending the stored status messages to the monitoring server and reverting the sending of status messages from the monitored computing devices to provide that status messages being send from the monitored computing devices are again directed to the monitoring server via the network communication link, wherein the alert cache system again does not receive the status messages directed to the monitoring server when the network communication link is online.

11. The system of claim 10, wherein the monitoring console is located in the first geographical location.

12. The system of claim 10, wherein the network communication link is based on the Internet.

13. The system of claim 10, wherein the alert definition comprises alert descriptors.

14. The system of claim 10, wherein the alert cache system is inactive when the network communication link is active.

15. The system of claim 10, wherein the computing devices comprise at least one of a computer system, a network device, a computing server, a storage system, or an embedded system.

16. The system of claim 10, wherein the first alert message is additionally sent to the alert cache system by the monitoring server.

17. The system of claim 10, wherein the monitoring server sends the first alert message via an alternative communication link to the monitoring console.

18. The system of claim 10, wherein the alert cache system sends a third message to the monitoring console based on the network communication link failing.

19. A computer program product for monitoring computing devices by a monitoring server, the computer program product comprising:
    a computer readable storage medium readable by a processing circuit and storing instructions for execution by the processing circuit to perform a method comprising:
        receiving a first alert message at a monitoring console if a condition is detected by the monitoring server, wherein the condition is defined in an alert definition, and wherein status messages being sent from the monitored computing devices are initially directed to the monitoring server via a network communication link between the computing devices and the monitoring server when the communication link is online, wherein an alert cache system which is part of the computing devices does not receive the status messages directed to the monitoring server when the network communication link is online, and wherein the monitored computing devices reside at a first geographical location and the monitoring server resides at a second geographical location, the first geographical location being different from the second geographical location;
        communicating the alert definition to the alert cache system; and
        based on the network communication link between the computing devices and the monitoring server failing, performing the following:
            redirecting the sending of status messages from the computing devices, the redirecting providing that status messages being sent from the monitored computing devices are directed to the alert cache system instead of to the monitoring server via the network communication link, wherein based on the network communication link failing, the alert cache system commences receipt of the status messages;
            storing, in the alert cache system, status messages sent from the monitored computing devices to the alert cache system until the network communication link is back online; and
            sending a second alert message from the alert cache system to the monitoring console if a condition is detected by the alert cache system that is based on the communicated alert definition from the monitoring server to the alert cache system; and
        based on the network communication link between the computing devices and the monitoring server going back online, sending the stored status messages to the monitoring server and reverting the sending of status messages from the monitored computing devices to provide that the status messages being sent from the monitored computing devices are again directed to the monitoring server via the network communication link, wherein the alert cache system again does not receive the status messages directed to the monitoring server when the network communication link is online.

* * * * *